United States Patent
van den Berg

[19]

[11] Patent Number: 6,079,359
[45] Date of Patent: Jun. 27, 2000

[54] IMPLEMENT FOR AUTOMATICALLY MILKING ANIMALS

[75] Inventor: Karel van den Berg, Bleskensgraaf, Netherlands

[73] Assignee: Maasland N.V., Maasland, Netherlands

[21] Appl. No.: 09/253,067

[22] Filed: Feb. 19, 1999

Related U.S. Application Data

[63] Continuation of application No. PCT/NL98/00376, Jul. 1, 1998.

[30] Foreign Application Priority Data

Jul. 4, 1997 [NL] Netherlands .......................... 1006473

[51] Int. Cl.[7] ..................................... A01J 7/04
[52] U.S. Cl. ..................................... 119/14.01; 119/14.18
[58] Field of Search ............................. 119/14.01, 14.08, 119/14.1, 14.18, 670

[56] References Cited

U.S. PATENT DOCUMENTS

| | | |
|---|---|---|
| 3,554,166 | 1/1971 | Belden ................................. 119/14.01 |
| 4,669,425 | 6/1987 | Cook ...................................... 119/670 |
| 4,702,197 | 10/1987 | Icking et al. ........................... 119/14.18 |
| 5,235,937 | 8/1993 | Farina et al. .......................... 119/14.01 |
| 5,275,124 | 1/1994 | Van Der Lely et al. ............. 119/14.08 |
| 5,678,506 | 10/1997 | Van Der Berg et al. .............. 119/670 |

FOREIGN PATENT DOCUMENTS 0088165  9/1983  European Pat. Off. ........... 119/14.18

Primary Examiner—Peter M. Poon
Assistant Examiner—Elizabeth Shaw
Attorney, Agent, or Firm—Penrose Lucas Albright

[57] ABSTRACT

An apparatus for automatically milking animals, such as cows, which comprises a rinsing circuit for cleaning milk and cleaning lines in the apparatus. The rinsing circuit includes a rinsing fluid tank, a cleaning member for cleaning the teats and udders of animals milked by the apparatus, and a cleaning device for cleaning the cleaning member. The cleaning device is connected to the rinsing tank via a line which includes a buffer vessel having a volume of approximately 3,000 cc and a measuring vessel having a volume of approximately 300 cc. Such line also contains valves plus a bleed/compressed air connection for delivering predetermined amounts of cleaning fluid to the cleaning device.

21 Claims, 4 Drawing Sheets

IMPLEMENT FOR AUTOMATICALLY MILKING ANIMALS

RELATED APPLICATION

This Application is a continuation of International Application No. PCT/NL98/00376, filed Jul. 1, 1998.

FIELD OF THE INVENTION

The invention relates to an apparatus for automatically milking animals, such as cows, which apparatus comprises a rinsing circuit for at least cleaning teat cups, wash lines and milk lines, in which rinsing circuit there is included a rinsing fluid tank, the apparatus being further provided with at least one cleaning member for cleaning the teats or udder or both of the animal, as well as a device for cleaning of the cleaning members.

SUMMARY OF THE INVENTION

The invention aims at providing in a simple and cheap manner a means for cleaning the cleaning member. In accordance with the invention, this is achieved by the cleaning device being connected via a line to the rinsing fluid tank. In this manner rinsing fluid which is normally only used for cleaning parts that have come into contact with the milk, such as the milk lines, can also be used for cleaning the cleaning members.

According to an inventive feature, in the cleaning fluid supply line there is included a buffer tank for storage of cleaning fluid. It is possible to store in the buffer tank cleaning fluid which has been produced in the rinsing fluid tank, so that this fluid can be used for cleaning of the cleaning members without impeding the rest of the cleaning circuit.

In accordance with a further inventive feature, a shut-off valve is included in the cleaning fluid supply line between the buffer vessel and the cleaning device so that cleaning fluid can be supplied in a dosed manner to the cleaning members. For automation purposes the shut-off valve is designed as a computer-controlled two-way valve. According to the invention, the cleaning fluid supply line between the rinsing fluid tank and the buffer vessel can also be closed by means of such a valve. In order to prevent the rinsing fluid tank or the buffer vessel or both from forming a vacuum during the out-flow of rinsing fluid, these containers comprise a bleed or vent line in which a shut-off valve is included. In accordance with the invention, for the purpose of accelerating the flowing out of the fluid present in the rinsing fluid tank or the buffer vessel or both, it is also possible to connect either or both a compressed air line which is also provided with a shut-off valve. The aforementioned shut-off valves may be computer-controlled valves. In accordance with a further inventive feature, for economizing cleaning fluid there is included at least one measuring vessel in the cleaning fluid supply line between the buffer vessel and the shut-off valve for the cleaning device. According to the invention, the content of the measuring vessel can be selected so that the quantity of cleaning fluid the measuring vessel can contain is just enough for a proper cleaning of the cleaning members after a cleaning. In a preferred embodiment of the invention, the content of the buffer vessel amounts to approximately three thousand cubic centimeters, whereas the content of the measuring vessel amounts to approximately three hundred cubic centimeters. Three hundred cubic centimeters of cleaning/disinfecting fluid is just enough for cleaning, that is disinfecting, the cleaning members after one cleaning of the teats of the udder of the animal to be milked. It will be obvious that the volume of the buffer vessel or the measuring vessel or both depends on their dimensions or the degree of contamination of the cleaning members or both. In order to prevent the quantity of rinsing fluid supplied to the cleaning device exceeding the content of the measuring vessel, according to the invention a non-return valve or a shut-off valve is provided between the buffer vessel and the measuring vessel. Said non-return valve or shut-off valve may be included in the cleaning fluid supply line or may be disposed between the buffer vessel and the measuring vessel.

According to a further inventive feature, there is connected to the measuring vessel a bleed/compressed air line in which a shut-off valve is included which is preferably designed as a computer-controlled three-way valve. In a favorable embodiment of the invention, the compressed air line is capable of cooperating with the non-return valve between the buffer vessel and the measuring vessel, the arrangement being such that, when pressure is applied to the measuring vessel, the latter is shut-off from the buffer vessel and the fluid contents of the measuring vessel flow to the cleaning device.

According to again another aspect of the invention, the above described apparatus can be applied very well in combination with a milking robot for automatically connecting teat cups to the teats of an animal to be milked.

According to a further aspect of the invention, the cleaning members can be placed under the udder of an animal to be cleaned with the aid of the milking robot or a separate robot.

BRIEF DESCRIPTION OF THE DRAWINGS

The invention will now be explained in further detail with reference to first, second, third and fourth embodiments, as represented in the accompanying FIGS. 1, 2, 3 and 4, showing first, second, third and fourth schematic arrangements of an apparatus for automatically milking animals, in which are indicated only those parts of the apparatus which are relevant for explanation of the present invention. It will be obvious, however, that the invention is by no means limited to these embodiments; the exemplary embodiments only serve to illustrate the invention.

DESCRIPTION OF THE PREFERRED EMBODIMENTS

Figure 1:
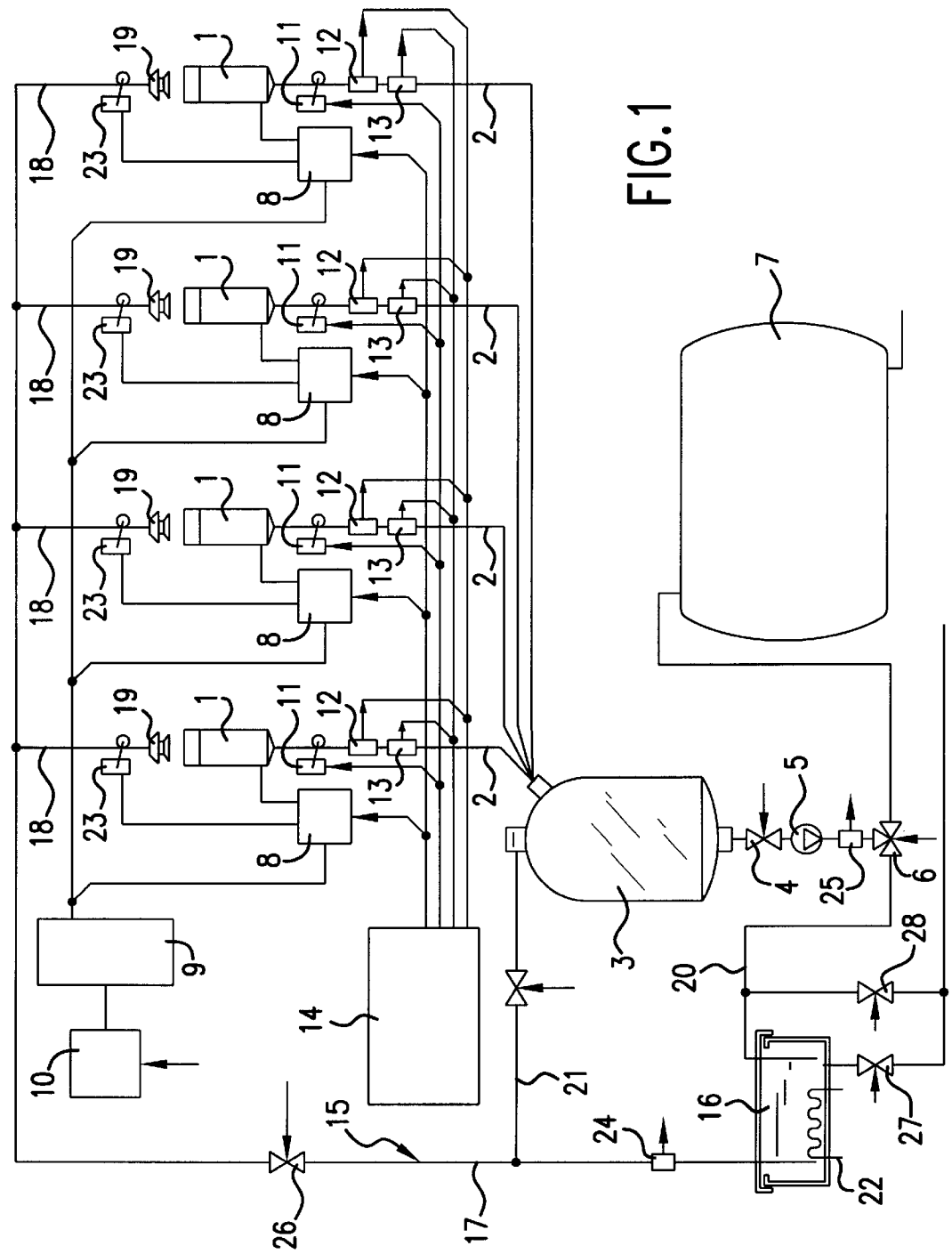

When the teat cups are to be connected, in a milkglass 3 a partial vacuum is applied by means of a vacuum balance tank 9 (connected to vacuum pump 10) and consequently air is drawn into the teat space of the relevant teat cups 1 and milk lines, to the extent, of course, that the latter have been released by the shut-off means 11. When the teat cups are connected simultaneously to an animal's teats, shut-off means 11 open the relevant milk lines 2 simultaneously; however, when the teat cups are connected consecutively, the milk lines are opened consecutively by shut-off means 11. As long as the relevant teat cup has not yet been connected to a teat, air is being drawn into that teat cup, so that in its teat space pressure still remains equal to that of the ambient environment. When by means of a pulsator 8 pressure is reduced in the pulsation space of this teat cup to a pressure somewhat lower than the ambient environmental pressure, the teat cups lining will be in a condition of rest or even drawn to some extent against the wall of the teat cup. When in this condition the teat cup can be received around the teat of an animal to be milked without the teat cup's lining being affected thereby. As soon as the teat cup has been entirely received around the animal's teat, in the teat space a vacuum builds up which is measured by a vacuum sensor 12 and which, when a predetermined level of vacuum has been reached, sends a signal indicating said value to a computer 14 which controls the pulsator 8 for applying a pulsating vacuum in the pulsation space of teat cup 1. In order to stimulate the milk yield, the pulsation frequency may be higher in a first stage than in a further stage of milking. When, after a time, the milk flow decreases and is below a predetermined threshold value, a flow sensor 13 transmits a signal to computer 14 which causes pulsator 8 to substitute a steady vacuum for the pulsating vacuum in the pulsation space of teat cup 1 so that the lining of teat cup 1 is drawn against the wall of the teat cup. This steady vacuum will be equal to or somewhat lower than the vacuum in milk line 2. When the lining has been drawn to the wall of teat cup 1, the vacuum in the teat space can subsequently be removed and the teat cup can be disconnected. Due to the pressure applied in the pulsation space by means of the computer relative to the pressure in the teat space, in particular during connection and disconnection of the teat cups, the pressure differential is such during the connections and disconnections of the teat cups that the wear of the teat cups' lining is limited to a considerable extent.

When undesired vacuum fluctuations occur in the teat spaces and the milk lines, which fluctuations can be detected by continuously measuring the vacuum by means of vacuum sensors 12, then with the aid of computer 14, control signals can be derived and supplied to the relevant shut-off means to maintain a constant vacuum. A vacuum sensor 12, computer 14 and a shut-off means 11 form together a control chain for maintaining the degree of vacuum in a relevant milk line 2 at a constant value as governed by computer 14.

In addition to providing the correct pressure in the pulsation space, pulsators 8 may also play a role during rinsing of teat cups 1. For the purpose of rinsing, the apparatus comprises a rinsing circuit 15 which is constituted by a rinsing fluid tank 16, a common rinsing fluid supply line 17, separate rinsing fluid supply lines 18 which are all connected to the common rinsing fluid supply line 17, and rinsing jetters 19, each connected to a separate rinsing fluid supply line 18, to which lines 18 rinsing jetters 19 for teat cups 1 are connected. For the purpose of obtaining a closed rinsing circuit, milkglass 3 is connected to rinsing fluid tank 16 via valve 6 and a return line 20. By means of a rinsing fluid line 21 a shortened rinsing circuit is provided from milkglass 3 to the common rinsing line 17. With the aid of a heating element 22 in rinsing fluid tank 16, water received in tank 16 may be heated to preferably 40° C. to 50° C. Such water, containing a detergent, can be drawn due to vacuum into milkglass 3 via the common rinsing fluid supply line 17, separate rinsing fluid supply lines 18, rinsing jetters 19, teat cups 1 and milk lines 2. This rinsing fluid is then pumped back via valve 4 by means of pump 5 and via valve 6 to rinsing fluid tank 16.

When the rinsing fluid is passed through the separate rinsing fluid supply lines 18, it may occur that the quantities of rinsing fluid passing through the various teat cups differ from each other to a considerable extent. Therefore, a shut-off means 23 is included in each rinsing fluid supply lines 18. Each shut-off means 23 is under the control of a pulsator 8. Pulsators 8 can be controlled by computer 14 in such a manner that the shut-off means 23 connected to the relevant pulsators consecutively release and shut-off the rinsing fluid supply lines 18, so that rinsing fluid is passed consecutively through the respective teat cups 1.

Apart from a closed rinsing circuit, there may also be used an open rinsing circuit. In that case water warmer than approximately 75° C. or possibly steam is drawn from rinsing fluid tank 16 and passed via the common rinsing fluid supply line 17, separate rinsing fluid supply lines 18 and rinsing jetters 19 through the teat cups and is discharged from there, with the aid of pump 5, through milk lines 2, via milkglass 3, to, if desired, a sewer. Although water is wasted thereby, due to the fact that the temperature of the rinsing water is very high or steam is applied, the flow-time of the rinsing water through the teat cups and the milk lines can be very short, for example, two to five minutes. Furthermore, in that situation no chemical detergents need to be added to the water. Particularly in the case that also milk tank 7 has to be cleaned, rinsing water may be passed from milkglass 3 by means of pump 5 and via valve 6 to milk tank 7.

In order to ensure an optimal rinsing of the teat cups, the temperature of the rinsing fluid during rinsing is maintained as constant as possible. To this end temperature sensors 24 and 25 are included in rinsing circuit 15. These temperature sensors connect with computer 14 which controls heating element 22 in the rinsing fluid tank. It should be noted that the figures show various not previously mentioned computer-controlled valves 26, 27 and 28 which are of importance for the beginning and the end of the rinsing process of the teat cups, the milk lines and the milkglass, and for the discharge of the rinsing fluid either directly or via rinsing fluid tank 16 to the sewer.

Figure 2:
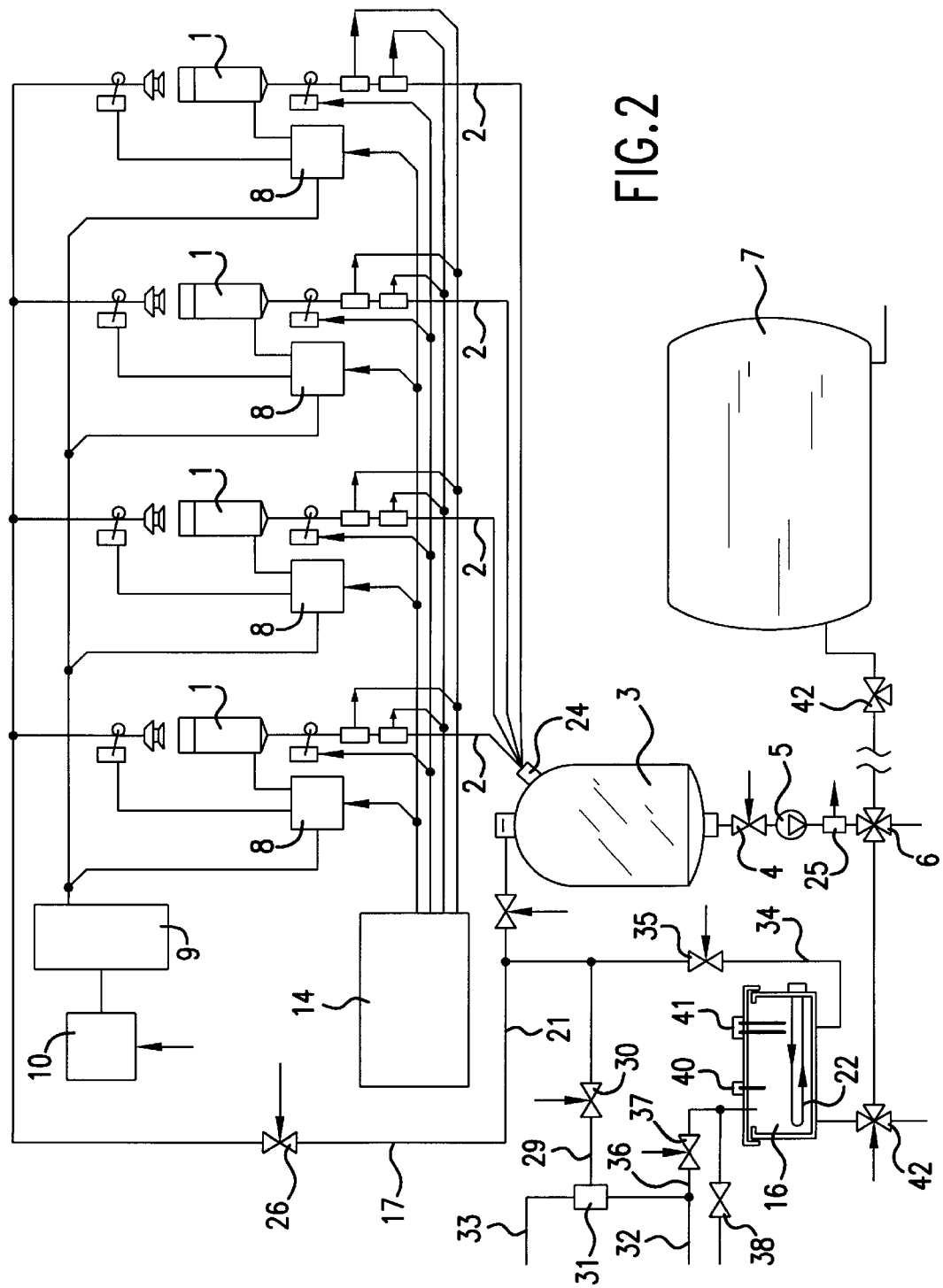

FIG. 2 shows a second embodiment of the invention, in which the parts corresponding with FIG. 1 are indicated by the same reference numerals. In the apparatus represented in FIG. 2, to the rinsing fluid supply line 17 a first supply line 29 for rinsing fluid, such as water, is connected. In first supply line 29 there is a computer-controlled valve 30. For the purpose of controlling the temperature of the rinsing fluid, the first supply line 29 comprises a thermostatically controlled valve 31 to which a hot-water line 32 and a cold-water line 33 are connected. For the purpose of pre-rinsing the milk lines, the teat cups and the milkglass, thermostatically controlled valve 31 is set, by means of computer 14, at a rinsing fluid temperature of between 32° C. and 42° C., preferably approximately 37° C., and computer-controlled valve 30 is opened for approximately five to seven minutes.

To rinsing fluid supply line 17 a second supply line 34 for a further rinsing fluid is additionally connected, said second supply line 34 extending from rinsing fluid tank 16. Second supply line 34 also comprises a valve 35 controlled by computer 14. In the present embodiment the further rinsing fluid is hot water which, via a line 36 branched off from hot-water line 32, can flow into rinsing fluid tank 16 when the computer-controlled valve 37 included in the line 36 is opened by means of a signal from computer 14. To line 36, following valve 37, there are additionally connected lines which lead to a computer-controlled valve 38 along which a base or an acid can be supplied to the hot water.

In the second embodiment, rinsing fluid tank 16 comprises a heating element 22 controlled by a thermostat 40, by means of which heating element 22 the water can be heated up to a temperature of approximately 78° C., which temperature is very suitable for heat-cleaning. In order to prevent rinsing fluid tank 16 from boiling dry, the latter comprises liquid level probes 41 supplying a signal to computer 14 if there is no water or not enough water present in rinsing fluid tank 16.

In the rinsing circuit, near milkglass 3, there is furthermore included a temperature sensor 24 with the aid of which the temperature of the rinsing fluid can be measured, the result of this measurement being supplied to computer 14. The temperature sensor 24 is preferably disposed at the end of the rinsing circuit, i.e., spaced apart from the first and second supply lines, so that at the end of the rinsing circuit it can be checked whether or not the desired and minimum temperatures of the pre-rinsing and rinsing fluids have also been reached. If the minimum temperature is not reached, computer 14, in the pre-rinsing cycle, supplies a signal to the thermostatically controlled valve 31 or, in the main rinsing cycle, supplies a signal to the thermostat 40, until the desire minimum temperature of the pre-rinsing and rinsing fluids have been reached.

For discharging the rinsing fluid into, for example, a sewer, the rinsing circuit comprises another two computer-controlled valves 42. Infected milk, if any, or foremilk can be discharged to the sewer after opening the computer-controlled valve 6. The computer-controlled valve 6 is preferably arranged close to the milk collecting element 3.

Figure 3:
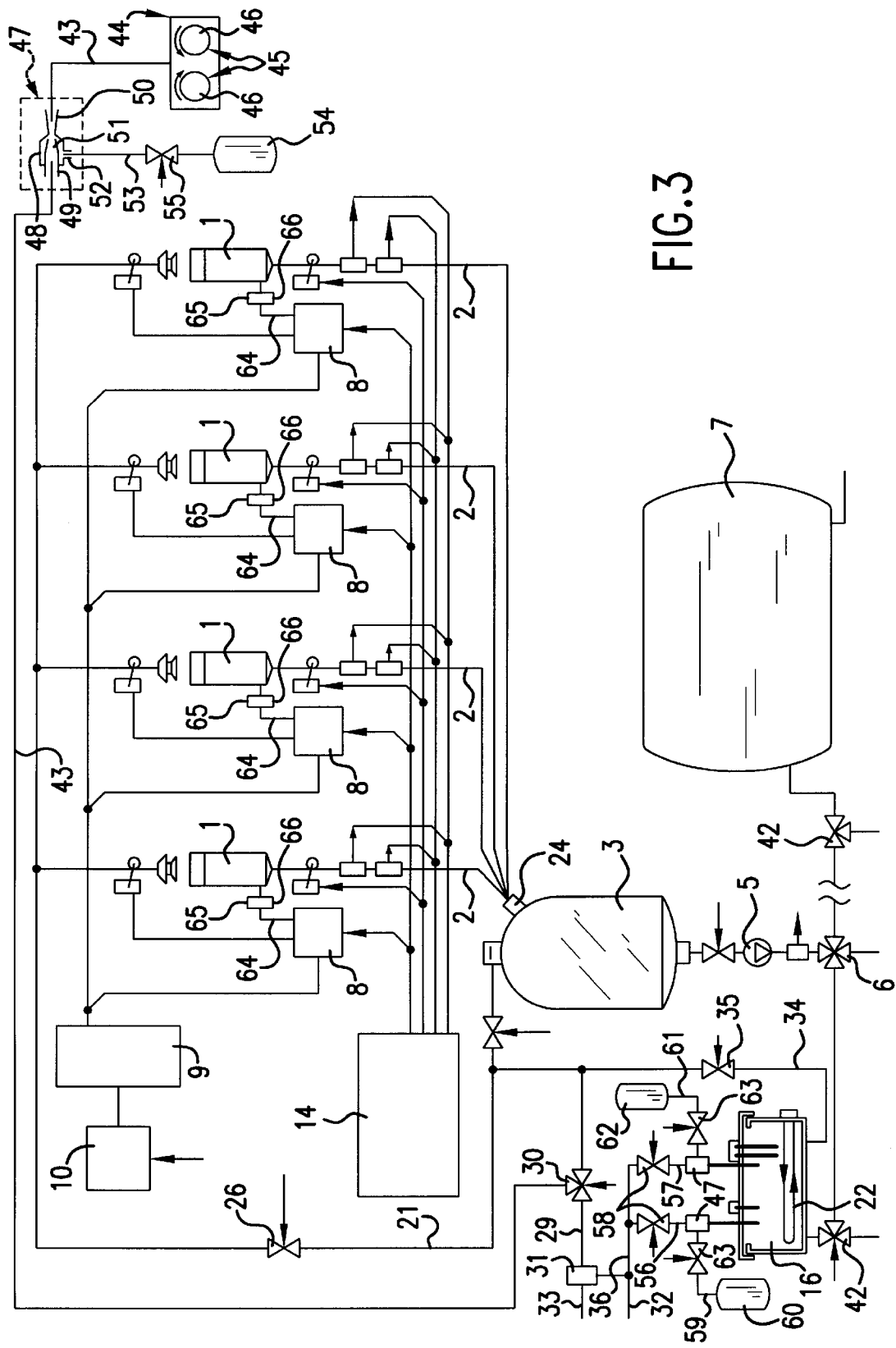

FIG. 3 shows a third embodiment of the invention, in which the parts corresponding with FIGS. 1 and 2 are indicated by the same reference numerals. In the apparatus shown in FIG. 3 the computer-controlled valve 30 is designed as a three-way valve. To three-way valve 30 is connected a rinsing fluid line 43 by means of which rinsing fluid supplied via the first supply line 29 can be conveyed to a cleaning device 44 for cleaning of the cleaning members 45 with the aid of which the udder or teats or both of an animal are cleaned. In the present embodiment, cleaning members 45 are designed as two spaced apart cleaning rollers 46 which can be moved to a position under the animal's udder by means of a robot (not shown). During cleaning the teats are cleaned by being rubbed between the cleaning rollers 46 which rotate in opposite directions.

A venturi device 47 is installed in rinsing fluid line 43. Venturi device 47 comprises a cylindrical housing 48 with a supply nipple 49 and a discharge nipple 50. Supply nipple 49 extends in the cylindrical housing 48 to proximate discharge nipple 50 and has a tapering end portion 51. By means of a further nipple 52 and a further line 53, a tank 54 containing disinfecting fluid, such as chlorine, is connected to cylindrical housing 48. In further line 53 is a computer-controlled valve 55. If it is desirable to clean cleaning members 45 with a chlorine-water mixture, such a mixture can be obtained by opening computer-controlled valve 55. Water flowing through venturi device 47 creates vacuum in cylindrical housing 48, so that disinfecting fluid present in tank 54 is drawn into cylindrical housing 48 and mixed with water flowing therethrough.

In the embodiment shown in FIG. 3, adding of acid or lye to rinsing fluid tank 16 takes place in an analogous manner as adding disinfecting fluid to rinsing fluid line 43. For this purpose line 36 is split up into a first line 56 and a second line 57 both discharging into rinsing fluid tank 16. In first line 56 and also in second line 57 there is included a venturi device 47, while in both lines 56 and 57 are computer-controlled valves 58. A tank 60 is connected, via a line 59, to venturi device 47 in first line 56. Tank 60 contains an alkaline liquid, a tank 62 is connected, via a line 61, to venturi device 47 that is included in second line 57. Tank 62 contains an acid. In the lines 59 and 61 computer-controlled valves 63 are provided.

Each of teat cups 1 is further provided with a pulsation line 64 in which a dung separating device 65 is included. Dung separating device 65 comprises a vessel 66 to which, near its upper side, interrupted by vessel 66, pulsation line 64 is connected. The dung separating device 65 is included in pulsation line 64 between teat cup 1 and pulsator 8.

Figure 4:
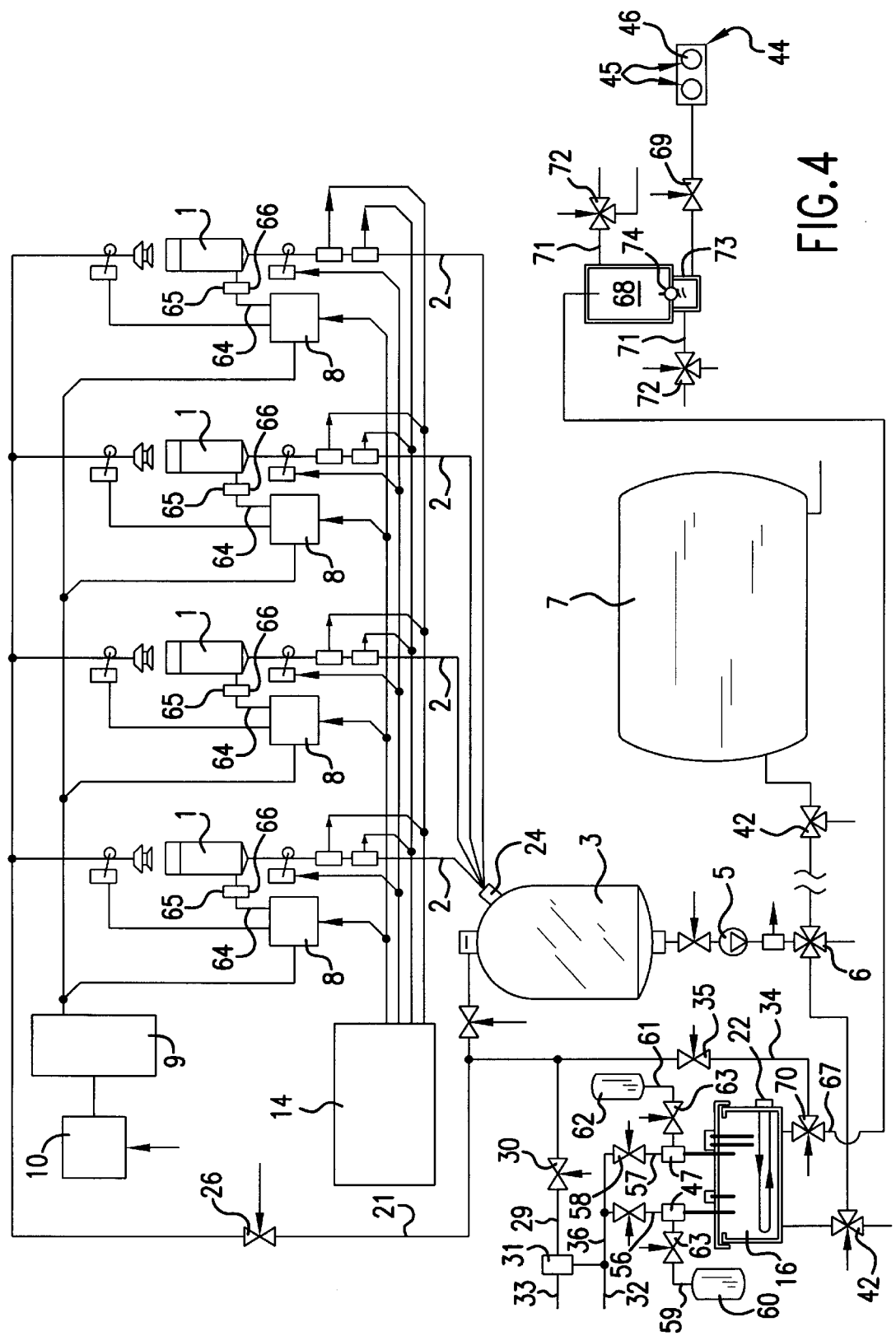

FIG. 4 depicts a fourth embodiment of the invention, in which parts corresponding with FIGS. 1, 2 and 3 are indicated by the same reference numerals. Via a cleaning fluid supply line 67, cleaning device 44 is connected to rinsing fluid tank 16. A buffer vessel 68 is provided in cleaning fluid supply line 67 for receiving rinsing fluid for cleaning device 44. Further, in cleaning fluid supply line 67, between buffer vessel 68 and the cleaning device 44, a computer-controlled two-way valve 69 is included. There is also included a computer-controlled two-way valve 70 in cleaning fluid supply line 67 between rinsing fluid tank 16 and buffer vessel 68, so that, when buffer vessel 68 is filled, by shutting-off the cleaning fluid supply line 67, buffer vessel 68 can be isolated from the cleaning circuit in which rinsing fluid tank 16 is included. Also connected to buffer vessel 68 is a compressed air line 71 comprising a computer-controlled three-way valve 72 by means of which it is possible to vent buffer vessel 68 on one hand and to apply a positive pressure therein on the other. Near the lower side of buffer vessel 68 a measuring vessel 73 is provided that is connected to buffer vessel 68 via valving means comprising a non-return valve 74. From buffer vessel 68, via non-return valve 74, a predetermined quantity of cleaning fluid or disinfecting fluid or both can flow into measuring vessel 73; flow in the opposite direction is not possible. In a preferred embodiment of the invention, the volume of buffer vessel 68 is approximately three thousand cc, while the volume of measuring vessel 73 is approximately three hundred cubic centimeters. To measuring vessel 73 there is also connected a compressed air line also including a computer-controlled three-way valve for venting measuring vessel 73 on one hand, and consequently to equalize pressure therein to the same level as that in buffer vessel 68, and on the other hand to apply positive pressure therein by means of compressed air. When there is applied a positive pressure in measuring vessel 73, the latter is automatically closed from buffer vessel 68 by means of non-return valve 74 and rinsing fluid can be supplied to the cleaning device when the computer-controlled two-way valve 69 is opened, whereafter cleaning members 45 are cleaned or disinfected or both.

According to the invention it is possible to dispose, in addition to measuring vessel 73, one or more additional measuring vessels near the lower side of the buffer tank, for the purpose of cleaning therewith in a similar manner other parts of the milking apparatus, such as, for example, the teat cups.

Although I have disclosed the preferred embodiments of my invention, it is to be understood that it is capable of other adaptations and modifications within the scope of the following claims:

Having disclosed my invention, what I claim as new and to be secured by Letters Patent of the United States of America is:

1. An apparatus for automatically milking animals, such as cows, which comprises a rinsing circuit for at least cleaning teat cups, wash lines and milk lines, said rinsing circuit including, a rinsing fluid tank, at least one cleaning member that cleans an area of the animal comprising the teats and udder of the animal, a cleaning device for cleaning said cleaning member, said cleaning device being connected to a rinsing fluid tank via a cleaning fluid supply line.

2. An apparatus in accordance with claim 1, wherein said cleaning fluid supply line includes a buffer vessel for storage of cleaning fluid.

3. An apparatus in accordance with claim 2, comprising a shut-off valve in said cleaning fluid supply line between said buffer vessel and said cleaning device.

4. An apparatus in accordance with claim 3, wherein said shut-off valve is a computer-controlled two-way valve.

5. An apparatus in accordance with claim 3, comprising a further shut-off valve disposed between said rinsing fluid tank and said buffer vessel.

6. An apparatus in accordance with claim 5, wherein said further shut-off valve is a computer-controlled three-way valve.

7. An apparatus in accordance with claim 2, comprising a bleed/compressed air line which is connected to said buffer vessel and which includes another shut-off valve.

8. An apparatus in accordance with claim 7, wherein said another shut-off valve is a computer-controlled three-way valve.

9. An apparatus in accordance with claim 2, comprising a measuring vessel which is included in said cleaning fluid supply line.

10. An apparatus in accordance with claim 9, comprising valving means disposed between said buffer vessel and said measuring vessel in said cleaning fluid supply line.

11. An apparatus in accordance with claim 10, wherein said valving means comprises a non-return valve.

12. An apparatus in accordance with claim 10, wherein said valving means comprises a shut-off valve.

13. An apparatus in accordance with claim 9, comprising a bleed/compressed air line which is connected to said measuring vessel and includes another shut-off valve.

14. An apparatus in accordance with claim 13, wherein said another shut-off valve comprises a computer-controlled three-way valve.

15. An apparatus in accordance with claim 9, wherein the volume of said buffer vessel comprises approximately three thousand cubic centimeters and the volume of said measuring vessel comprises approximately three hundred cubic centimeters.

16. An apparatus in accordance with claim 1, comprising a milking robot for automatically connecting said teat cups to the teats of an animal to be milked.

17. An apparatus in accordance with claim 1, comprising robot means connected to said cleaning members for moving said cleaning members under the udder and teats of an animal to be cleaned by said cleaning member.

18. An apparatus for cleaning an automatic milking system which comprises a circuit which includes in series teat cups, a receptacle for receiving milk from said teat cups, a pump for discharging fluid from said receptacle, a rinsing fluid tank for receiving fluid from said pump, and a first line for conveying fluid from said fluid tank to said teat cups, a cleaning member that cleans parts of an animal comprising the animal's teats and udder, a cleaning device for cleaning said cleaning member, a second line for the passage of water to said cleaning device, a source of temperature controlled water for supplying said temperature controlled water to said second line, said second line received by said cleaning device, said second line and said first line selectively connected by a third line to said rinsing fluid tank.

19. An apparatus in accordance with claim 18, comprising a vessel for receiving cleaning fluid and measuring means for delivering a predetermined amount of said cleaning fluid to said cleaning device which are included in said second line.

20. An apparatus for cleaning a system for automatically milking animals, the apparatus comprising a circuit which includes in series teat cups, a receptacle for receiving fluid from said teat cups, evacuation means for removing fluid from said receptacle and conveying it to a rinsing fluid tank, and a first conduit from said rinsing fluid tank for conveying fluid back to said teat cups to complete said circuit, a cleaning member for cleaning the teats and udder of an animal being milked, a cleaning device for cleaning said cleaning member, a second line connecting said cleaning device to said rinsing fluid tank, and a vessel in said second line for storing cleaning fluid.

21. An apparatus in accordance with claim 20, comprising measuring and valving means in said second line for delivering a predetermined amount of fluid from said vessel to said cleaning device.

* * * * *